United States Patent
Luo et al.

(10) Patent No.: US 11,580,399 B2
(45) Date of Patent: Feb. 14, 2023

(54) SYSTEM AND METHOD FOR CONVOLUTIONAL LAYER STRUCTURE FOR NEURAL NETWORKS

(71) Applicant: Samsung Electronics Co., Ltd., Suwon-si (KR)

(72) Inventors: Chenchi Luo, Plano, TX (US); Manish Goel, Plano, TX (US); David Liu, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 943 days.

(21) Appl. No.: 16/400,007

(22) Filed: Apr. 30, 2019

(65) Prior Publication Data

US 2020/0349439 A1 Nov. 5, 2020

(51) Int. Cl.
- *G06N 3/08* (2006.01)
- *G06N 3/082* (2023.01)
- *G06F 17/15* (2006.01)
- *G06N 3/04* (2023.01)

(52) U.S. Cl.
CPC ............ *G06N 3/082* (2013.01); *G06F 17/15* (2013.01); *G06N 3/0472* (2013.01)

(58) Field of Classification Search
CPC .... G06F 17/15; G06N 3/0454; G06N 3/0472; G06N 3/063; G06N 3/082
See application file for complete search history.

(56) References Cited

U.S. PATENT DOCUMENTS

| | | | |
|---|---|---|---|
| 7,509,364 B2 | 3/2009 | Lopez-Estrada | |
| 9,668,699 B2 | 6/2017 | Georgescu et al. | |
| 2016/0019455 A1 | 1/2016 | Annapureddy | |
| 2016/0358068 A1 | 12/2016 | Brothers et al. | |
| 2016/0358070 A1 | 12/2016 | Brothers et al. | |
| 2018/0114117 A1 | 4/2018 | Lin et al. | |
| 2018/0181864 A1* | 6/2018 | Mathew | G06F 7/5443 |
| 2020/0097818 A1* | 3/2020 | Li | G06N 3/084 |
| 2020/0311549 A1* | 10/2020 | Wang | G06N 3/0454 |
| 2021/0042946 A1* | 2/2021 | Groh | B60W 60/001 |

OTHER PUBLICATIONS

Cui, et al., "Kernel Pooling for Convolutional Neural Networks", 2017 IEEE Conference on Computer Vision and Pattern Recognition (CVPR), Jul. 21-26, 2017, 10 pages.
Defferrard, et al., "Convolutional Neural Networks on Graphs with Fast Localized Spectral Filtering", arXiv:1606.09375v3 [cs.LG], Feb. 5, 2017, 30th Conference on Neural Information Processing Systems (NIPS 2016), Barcelona, Spain, 9 pages.
Suard, et al., "Using Kernel Basis with Relevance Vector Machine for Feature Selection", Artificial Neural Networks—ICANN 2009, Part II, Lecture Notes in Computer Science, vol. 5769, pp. 255-264.
Berar, et al., "Missing data estimation using polynomial Kernels", ICAPR 2005, Lecture Notes in Computer Science, vol. 3686, 6 pages.

* cited by examiner

*Primary Examiner* — Brent Johnston Hoover

(57) ABSTRACT

An electronic device, method, and computer readable medium for 3D association of detected objects are provided. The electronic device includes a memory and at least one processor coupled to the memory. The at least one processor configured to convolve an input to a neural network with a basis kernel to generate a convolution result, scale the convolution result by a scalar to create a scaled convolution result, and combine the scaled convolution result with one or more of a plurality of scaled convolution results to generate an output feature map.

20 Claims, 9 Drawing Sheets

SYSTEM AND METHOD FOR CONVOLUTIONAL LAYER STRUCTURE FOR NEURAL NETWORKS

TECHNICAL FIELD

This disclosure relates generally to neural networks. More specifically, this disclosure relates to a convolutional layer structure for neural networks.

BACKGROUND

Deep learning or deep neural networks is a revolutionary force in artificial intelligence. Neural networks help computers make sense of infinite amounts of data in the form of images, sound, and text. Using multiple layers of neural perceptrons, computers now have the capacity to see, learn, and react to complex situations as well as if not better than humans.

Most deep learning networks rely heavily on convolutional layers, which typically account for over 90% of total computation of the network. One convolutional layer typically has tens of thousands to millions of small 2D kernels. There are large amount of redundancies in these kernels and there is a need to compress or simplify these kernels to reduce the complexity of the neural networks.

SUMMARY

This disclosure provides a system and method for a convolutional layer structure for neural networks.

In one embodiment, an electronic device is provided. The electronic device includes a memory and at least one processor coupled to the memory. The at least one processor configured to convolve an input to a neural network with a basis kernel to generate a convolution result, scale the convolution result by a scalar to create a scaled convolution result, and combine the scaled convolution result with one or more of a plurality of scaled convolution results to generate an output feature map.

In another embodiment, a method for a neural network is provided. The method includes convolving an input to the neural network with a basis kernel to generate a convolution result, scaling the convolution result by a scalar to create a scaled convolution result, and combining the scaled convolution result with one or more of a plurality of scaled convolution results to generate an output feature map.

In another embodiment, a non-transitory computer readable medium embodying a computer program for operating an electronic device including a memory and at least one processor is provided. The computer program comprises computer readable program code that, when executed by the at least one processor, causes the electronic device to convolve an input to a neural network with a basis kernel to generate a convolution result, scale the convolution result by a scalar to create a scaled convolution result, and combine the scaled convolution result with one or more of a plurality of scaled convolution results to generate an output feature map.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
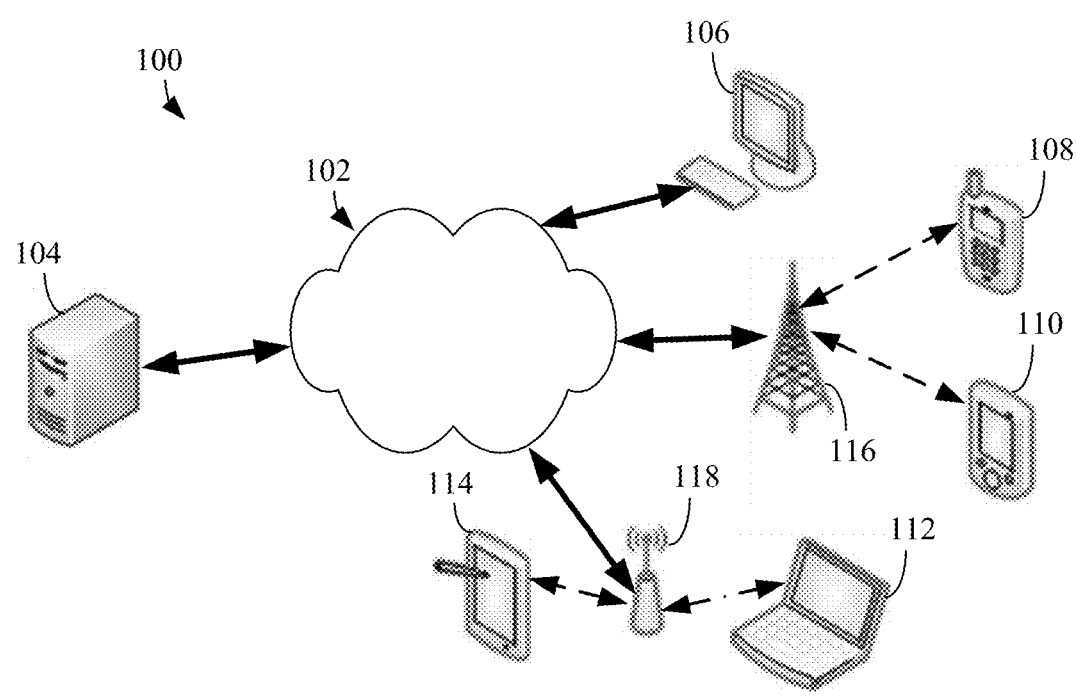
FIG. 1 illustrates an example communication system in accordance with embodiments of the present disclosure.

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

According to embodiments of the present disclosure, a convolutional basis filter layer for improving neural networks is provided. Deep neural networks can perform various functions such as image recognition, data analysis, natural language processing, intent classification, or other functions. Neural networks can generate an output based on a weighted sum of inputs, which is then passed through an activation function. The activation function is able to determine an output after summing the inputs multiplied by the weights. It will be understood by those skilled in the art that various activation functions can be used depending on the configuration of the neural network and the result to be achieved by the neural network.

The inputs, weights, and outputs can be organized within a multilayer perceptron (MLP), wherein there is an input layer, one or more hidden layers, and an output layer. A plurality of inputs, or an input vector, make up the input layer, a plurality of hidden layer neurons reside in the hidden layer or layers, and one or more outputs can be generated for the output layer. The neural network can be a feedforward network where inputs are passed from the input layer to a hidden layer. The inputs can be processed through an activation or transfer function to provide new inputs to a next hidden layer, if the neural network has multiple hidden layers, from hidden layer to hidden layer until the final hidden layer passes the final outputs to the output layer. As a neural network is trained, the weights can be adjusted based on calculated error rates to increase the accuracy of the neural network.

Convolutional neural networks can be used for image or object recognition. A convolution layer performs convolutions between an image and a filter or kernel (a matrix of values) to weight sections of the image based on the kernel in order to emphasize features in the image. Convolutions can be performed on a subset of the image at a time until the full image is weighted by a kernel. Kernels using different weights can be used for additional convolutions, creating a feature map as a result of each convolution. Each feature map can then be passed to the next layer of the neural network. Other layers of a convolutional neural network can be batch normalization layers, or Bnorm layers, rectified linear units (ReLU) layers, pooling layers, or others.

The Bnorm layer can be used to normalize the activation of each convolution layer. The ReLU layer applies an activation function to increase the nonlinear properties of the network, such as by zeroing out negative values. The pooling layer downsamples images or feature maps to allow for more efficient processing by subsequent layers. Max pooling is a common method of pooling that outputs the maximum value of a sub-region of an image or feature map. A convolutional neural network can perform any number of convolutions, batch normalizations, ReLU calculations, and pooling operations depending on the neural network. The image can be reduced down to a vector of values and a fully connected layer then takes the vector and provides one or more outputs, such as indicating whether the image matches a particular feature or object attempting to be detected. It will be appreciated that the present disclosure is not limited to any particular type of neural network and that this disclosure can be applied to any neural network.

A neural network based application, such as an object or image classification neural network running on a specific hardware, has multiple requirements, such as accuracy, execution speed, power consumption, and the like. Each time the network convolves an image or feature map with a filter or kernel, a number of multiply and accumulate (MAC) operations are performed with a number of parameters. The complexity of the convolutional layer thus has a direct effect on the speed and overall performance of the neural network.

FIG. 1 illustrates an example system 100 according to embodiments of this disclosure. The embodiment of the system 100 shown in FIG. 1 is for illustration only. Other embodiments of the system 100 could be used without departing from the scope of this disclosure.

The system 100 includes a network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-114. Server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or mobile devices 108 (such as a smartphone), a personal digital assistant (PDA) 110, a laptop computer 112, and a tablet computer 114. However, any other or additional client devices could be used in the system 100.

In this example, some client devices 108-114 communicate indirectly with the network 102. For example, the client devices 108 and 110 (mobile devices 108 and PDA 110, respectively) communicate via one or more base stations 116, such as cellular base stations or eNodeBs (eNBs). Mobile devices 108 include both smart phones and feature phones. Smart phones represent a class of mobile devices 108 that are a handheld device with a mobile operating system and an integrated mobile broadband cellular network connection for voice, short message service (SMS), and internet data communication. Feature phones represent a class of mobile devices 108 that are a midway point between a basic phone and a smart phone. Feature phones generally have voice calling and text messaging functions in addition to basic multimedia and internet capabilities. Also, the client devices 112 and 114 (laptop computer and tablet computer, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In certain embodiments, the mobile device 108 (or any other client device 106-114) can transmit information securely and efficiently to another device, such as, for example, the server 104. The mobile device 108 (or any other client device 106-114) can receive information to be processed as an input(s) into a neural network. Such information can include image data, voice/audio data, geolocation data, user information, or other data received by or stored on the mobile device 108. The mobile device 108 (or any other client device 106-114) can trigger the information transmission between itself and server 104. The mobile device 108 (or any other client device 106-114) can provide a real-time result generated by a neural network.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device or a server to provide a result processed by a neural network. In certain embodiments, a client device (client device 106-114) can determine the neural network result. In certain embodiments, a client device (client device 106-114) receives the data to be included as inputs into a neural network and transmits the data over the network 102 to the server 104, which determines the output(s) using the neural network.

Figure 2:
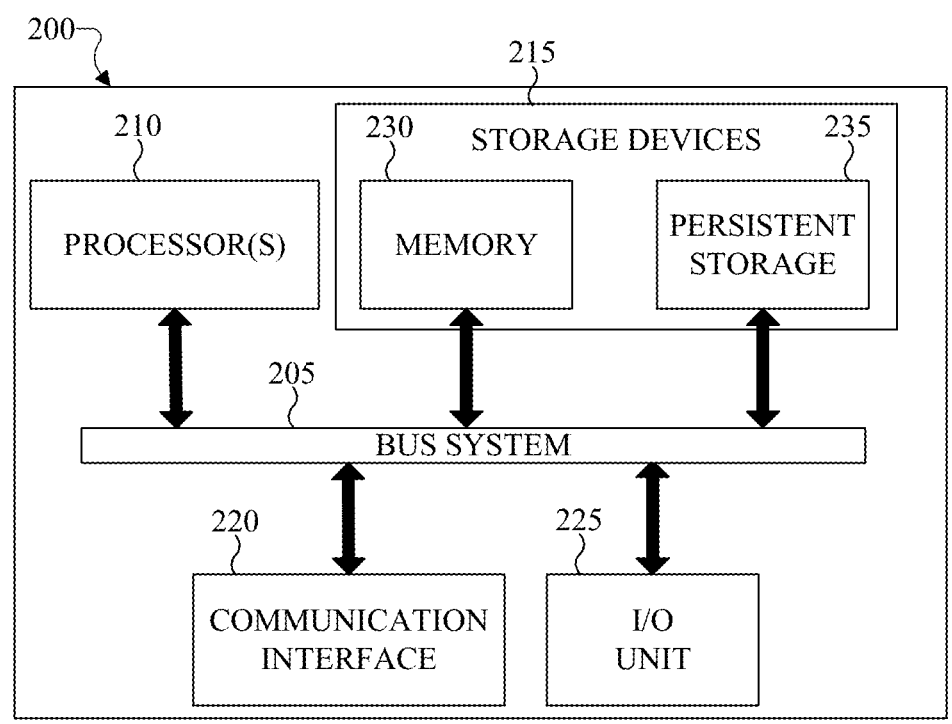
FIG. 2 illustrates an example electronic device server in accordance with embodiments of the present disclosure.
Figure 3:
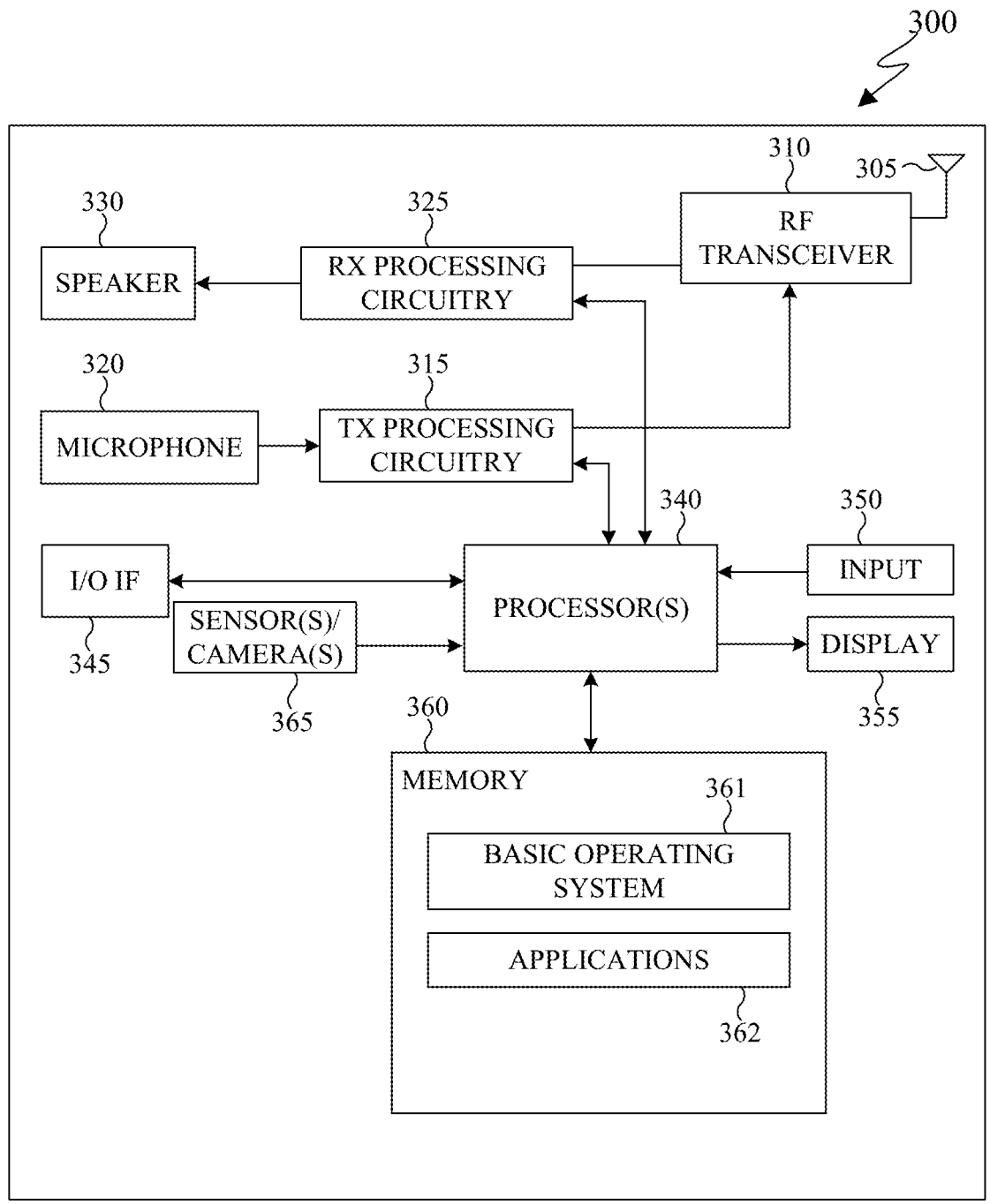
FIG. 3 illustrates an example electronic device in accordance with embodiments of the present disclosure.

FIGS. 2 and 3 illustrate example devices in a computing system in accordance with embodiments of the present disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

Server 200 can represent one or more local servers or one or more neural network servers for processing received inputs through a trained neural network. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, neural network inputs and other data, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the devices 104-114 of FIG. 1 can include the same or similar configuration as electronic device 300.

In certain embodiments, the electronic device 300 is useable with data transfer applications, such as providing neural network inputs or activating a function based on a neural network result or output. For example, the electronic device 300 can receive information, such as voice data, transfer the data to the server 200, receive a response from the server 200 indicating the result of processing the information through a neural network, and activate a function on the electronic device 300 in accordance with the result. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114), and the like.

As shown in FIG. 3, the electronic device 300 includes an antenna 305, a communication unit 310, a transmit (TX) processing circuitry 315, a microphone 320, and a receive (RX) processing circuitry 325. The communication unit 310 can include, for example, a RF transceiver, a BLUETOOTH transceiver, a WI-FI transceiver, ZIGBEE, infrared, and the like. The electronic device 300 also includes a speaker 330, a processor 340, an input/output (I/O) interface 345, an input 350, a display 355, a memory 360, a sensor(s) 365, and a biometric scanner 370. The memory 360 includes an operating system (OS) 361, applications 362, and user data 363.

The communication unit 310 receives, from the antenna 305, an incoming RF signal transmitted such as a BLUETOOTH or WI-FI signal from an access point (such as a base station, Wi-Fi router, Bluetooth device) of the network 102 (such as a Wi-Fi, Bluetooth, cellular, 5G, LTE, LTE-A, WiMAX, or any other type of wireless network). The communication unit 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data and remittance).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 is also capable of executing other applications 362 resident in the memory 360, such as, one or more applications for remittance, fraud detection, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 350 can be associated with sensor(s) and/or a camera 365 by providing additional input to processor 340. The camera can be used to capture images to be processed by a convolutional neural network. Such a convolutional neural network can be an application stored on the electronic device 300, or on the server 200, in which case the electronic device 300 can transmit a captured image to the server 200 to be processed by the neural network.

In certain embodiments, sensor 365 includes inertial sensors (such as, accelerometers, gyroscope, and magnetometer), optical sensors, motion sensors, cameras, pressure sensors, heart rate sensors, altimeter, breath sensors (such as microphone 320), and the like. The input 350 can also include a control circuit. In the capacitive scheme, the input 350 can recognize touch or proximity. The display 355 can be a liquid crystal display (LCD), light-emitting diode (LED) display, optical LED (OLED), active matrix OLED (AMOLED), or other display capable of rendering text and/or graphics, such as from websites, videos, games, images, and the like.

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The memory 360 also can contain user data 363 that includes profile data and user history data. User data 363 can also contain data received from sensor 365. User data 363 can biographical and biometric data.

Electronic device 300 further includes one or more sensor(s) 365 that can meter a physical quantity or detect an activation state of the electronic device 300 and convert metered or detected information into an electrical signal. In certain embodiments, sensor 365 includes inertial sensors (such as accelerometers, gyroscopes, and magnetometers), optical sensors, motion sensors, cameras, pressure sensors, heart rate sensors, altimeter, breath sensors (such as microphone 320), and the like. For example, sensor 365 can include one or more buttons for touch input, (such as on a headset or the electronic device 300), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor 365 can further include a control circuit for controlling at least one of the sensors included therein. The sensor(s) 365 can be used to determine an orientation and facing direction, as well as geographic location of the electronic device 300. Any of these sensor(s) 365 can be located within the electronic device 300 or another electronic device in communication with the electronic device 300.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
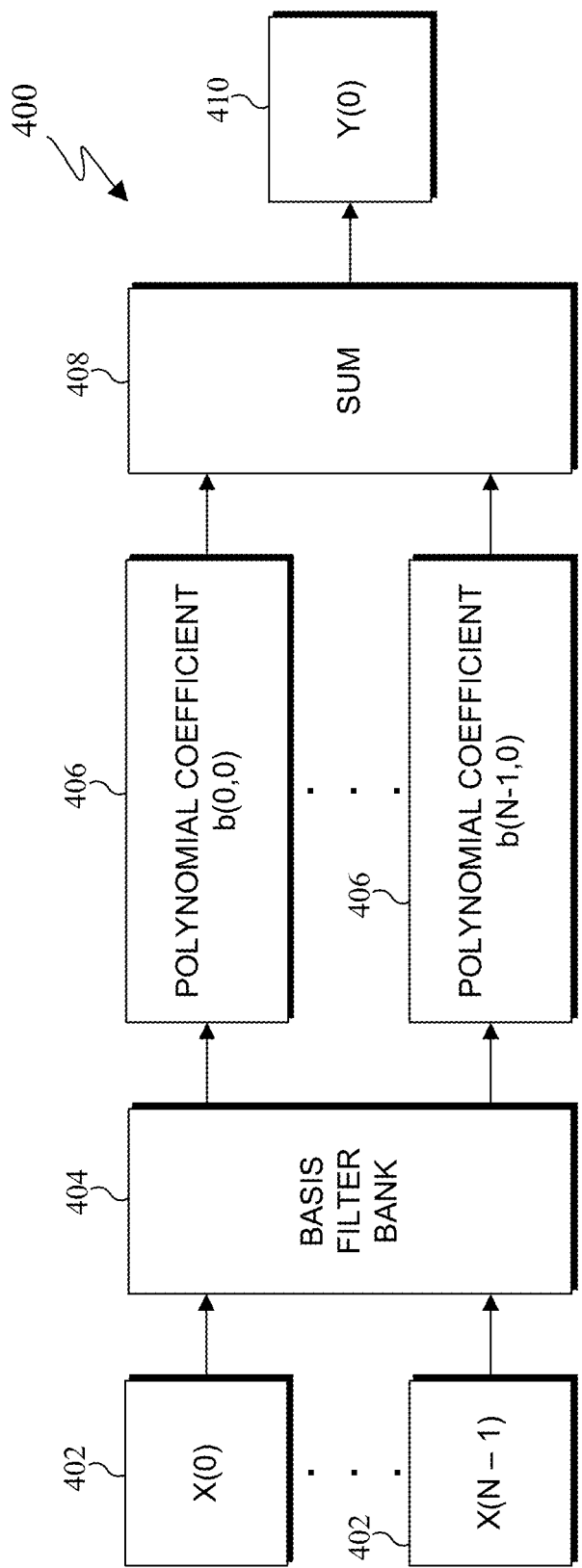
FIG. 4 illustrates a block diagram of an example convolutional basis filter layer in accordance with embodiments of the present disclosure.

FIG. 4 illustrates a block diagram of an example convolutional basis filter layer 400 in accordance with embodiments of the present disclosure. The processor 210 of the server 200 or the processor 340 of electronic device 300 can execute the layer 400. The processor receives a plurality of inputs 402, such as channels of an image or feature maps, as the inputs into the layer 400. Each of the inputs 402 can be arranged as a series of pixel values in a matrix for processing by the layer 400. In other convolutional layers, each of the inputs 402 would be convolved with one or more kernels or filters, matrices that include weight values. The results of the convolutions are summed, producing an output feature map. This process can be repeated depending on the design of the neural network. For example, if the network is designed such that four output feature maps are to be generated by a convolutional layer, four different filters can be used for each of the inputs 402 to create four output feature maps. This process can be illustrated by the following equation 1:

$$Y(j)=\Sigma_{i=0}^{N-1}X(i)*f(i,j) \quad (1)$$

The above equation 1 shows that, for N input channels with feature map X(i) of size H×W, and M output channels with feature map Y(j), there are MN kernels f(i,j) of size F×F. This convolutional layer structure can be optimized by synthesizing the kernels using polynomial approximation to create a bank of basis kernels to be used in the convolutions instead of the original kernel or filter. The filter f(i,j) can be synthesized with the following equation 2, where g(k) is a F×F basis filter and b(i,j) is a synthesis scalar:

$$f(i,j)=\Sigma_{k=0}^{K-1}g(k)b(i,j)^k \quad (2)$$

The basis filters and synthesis scalars can thus be used in place of filter f(i,j) to reduce the number of operations and the number of parameters or weights for the convolutional layer of a neural network. The operation of the convolutional basis filter layer 400 is thus defined by the following equation 3:

$$Y(j)=\Sigma_{i=0}^{N-1}[\Sigma_{k=0}^{K-1}X(i)*g(k)]b(i,j)^k \quad (3)$$

For a trained neural network with trained kernels or filters f(i,j), the optimal basis filters g(k) and the synthesis coefficients or scalars b(i,j) can be determined by the optimization routine of formula 4:

$$\min_{\substack{g(k)\\b(i,j)}}\left[f(i,j)-\sum_{k=0}^{K-1}g(k)b(i,j)^k\right]^2 \quad (4)$$

Implementing a convolutional basis filter layer 400 in a neural network thus does not require retraining the neural network, allowing any convolutional neural network to be optimized in accordance with this disclosure.

For each output Y(j), a basis filter bank 404 is stored, such as in the memory 230 of the server 200 or the memory 360 of the electronic device 300, including each basis filter associated with the output. For example, if the convolutional basis filter layer 400 is designed to produce four output feature maps Y(0)-Y(3), a basis filter bank with basis filters for producing feature maps Y(0)-Y(3) are created and stored. For each output Y(j), the processor convolves each of the inputs 402 with each of the basis filters in the filter bank, and then the processor scales the result of each convolution by a polynomial coefficient, synthesis scalar b(i,j)$^k$, at block 406, where the synthesis scalar is a value to the power of k. The processor at block 408 sums the results of the convolutions for a particular input 402, and then sums each of the summation results for all inputs 402 to create an output feature map 410.

For example, as illustrated in FIG. 4, a first input 402 is shown as X(0). The processor convolves X(0) with each of the basis filters in the basis filter bank 404, and scales each convolution result with b(0,0)$^k$. The processor sums each convolution result for X(0), and then repeats the process for each input through X(N−1). The processor then sums each convolved and scaled result created from inputs X(0)-X(N−1) at block 408 to generate output feature map 410.

Figure 5:
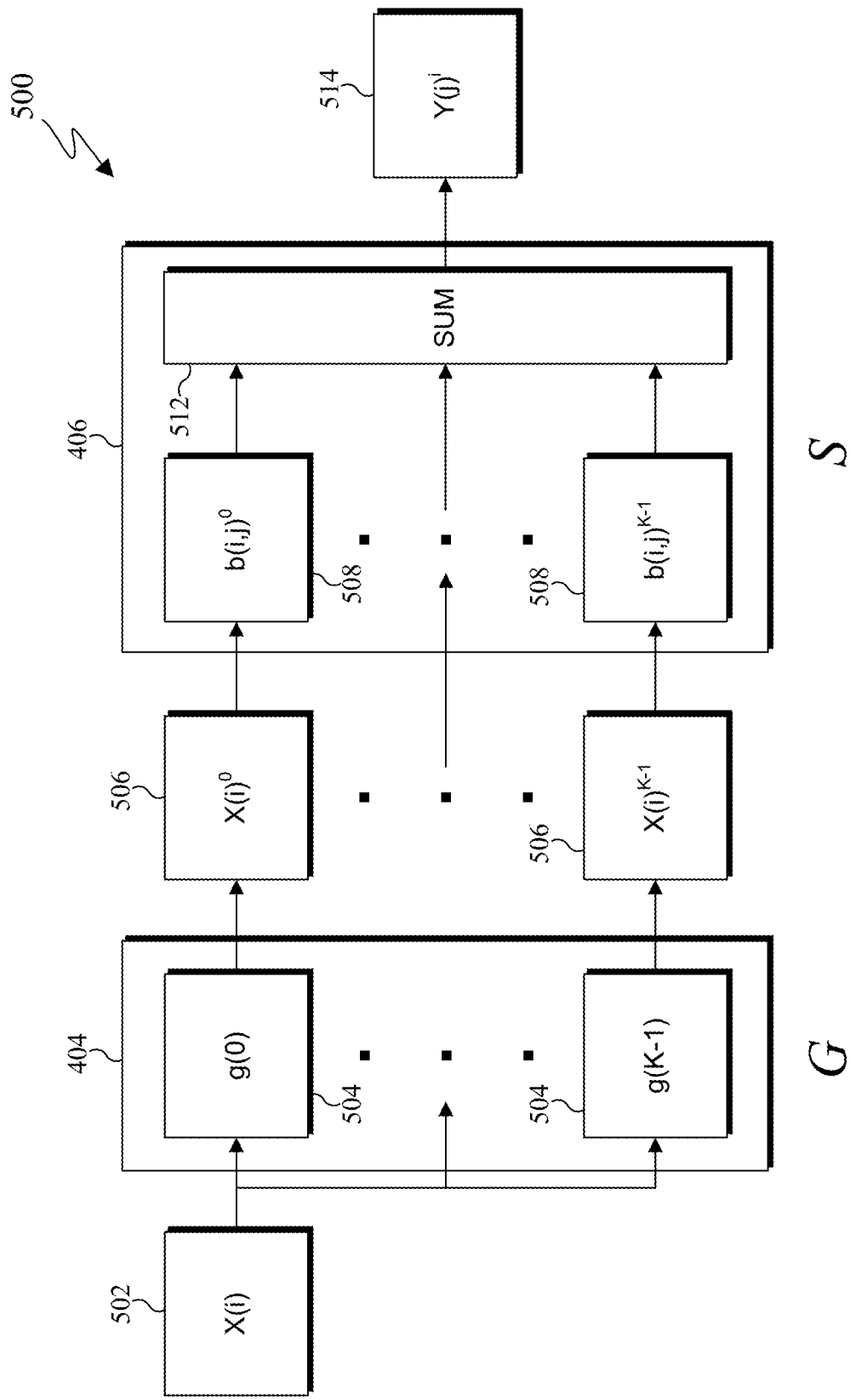
FIG. 5 illustrates a block diagram of an example convolutional basis filter layer operating on an input in accordance with embodiments of the present disclosure.

FIG. 5 illustrates a block diagram of an example convolutional basis filter layer 500 operating on an input 502 in accordance with embodiments of the present disclosure. The processor 210 of the server 200 or the processor 340 of electronic device 300 can execute the layer 500. The processor convolves the input 502, which can be one input of a plurality of inputs, with each basis filter 504 in the basis filter bank 404 (G). The result 506 of each convolution can be permanently or temporarily stored in a memory, such as in the memory 230 of the server 200 or the memory 360 of the electronic device 300. The processor scales each result 506 with a polynomial coefficient or scalar 508 at block 406 (S).

As illustrated in FIG. 5, the value of the scalar denoted as b(i,j) is the same across all inputs, as the value of b(i,j) is determined by the input i and the output j. The value of the scalar is, however, altered for each basis filter used. For example, as illustrated in FIG. 5, the processor scales the result 506, which is the result produced by convolving the input 502 with basis filter g(0), by the scalar 508 defined by b(i,j)$^0$, or the value of 1. This illustrates that, for inputs convolved with g(0), the scalar 508 is a value of 1, leaving the convolution result 506 unaltered. Thus, in some embodiments, the result 506 produced by convolving the input 502 with basis filter g(0) is not scaled in order to multiplied by a scalar in order to save an operation. For each convolution with basis filters other than g(0), the result 506 of the convolution is scaled by the scalar 508.

As illustrated in FIG. 5, the processor convolves the input 502 with every basis filter 504, through basis filter g(K−1). For example, after convolving the input 502 with basis filter g(K−1), the processor scales the result 506, denoted as X(i)$^{K-1}$ in FIG. 5, with a scalar 508 denoted as b(i,j)$^{K-1}$. For example, if K=5, then there would be four basis kernels in the basis filter bank 404. For the result 506 denoted as $X(i)^{K-1}$, the processor multiplies the result 506 by the scalar value $b(i,j)^4$. It will be understood that the scalar value $b(i,j)$ can be a single, real, number value.

Once the processor scales each of the results 506 with the associated scalar 508, the processor sums the scaled results at block 510, creating an output component 512, denoted as $Y(j)^i$ in FIG. 5. The process illustrated in FIG. 5 is repeated for every input through $X(N-1)$, creating output components 512 $Y(j)^i$ through $Y(j)^{N-1}$. The processor then sums each output component 512 created for each input ($Y(j)^i$-$Y(j)^{N-1}$) to generate an output feature map Y(j). The same basis filters in the filter bank 404 are used for every input, rather than using a different filter or kernel for every input or channel as in other convolutional neural networks.

The convolutional basis filter layer disclosed herein provides for significant reductions in the number of weights or parameters of the neural network, and reduces the number of operations the processor must perform, resulting in a faster and less resource intensive neural network. For other neural networks that do not employ the convolutional basis filter layer disclosed herein, the multiply and accumulate (MAC) operations are $H*W*F^2*N*M$, where H is the height of the input, W is the width of the input, $F^2$ is the size or dimension of the kernels, N is the number of channels, and M is the number of output channels. The MAC operations for the convolutional basis filter layer and the scalar multipliers disclosed herein are $H*W*F^2*K*N+H*W*K*N*M$. Compared to the number of MAC operations for other neural networks, this can result in a reduction factor for MAC operations of $F^2/K$.

The number of parameters can also be significantly reduced. For neural networks that do not employ the convolutional basis filter layer disclosed herein, the number of parameters is $F^2*N*M$. The number of parameters for the convolutional basis filter layer and the scalar multipliers disclosed herein is $F^2*K+N*M$, resulting in a reduction factor of $F^2$. For example, typically N and M are much greater than F and K. If F=5, and 5 basis filters are used (K=5), MAC operations can be reduced by a factor of 5, and the number of parameters can be reduced by a factor of 25. If the basis kernels g(k) are sparse, the speed of the convolution layer can be further increased. Sparsity of the basis kernels can be enforced by adding regularization terms to formula (4) listed herein. The convolution layer structure disclosed herein can also allow for the use of basis kernels of larger sizes than the filters of other neural networks, which in the other neural networks would be prohibitive due to unaffordable computational complexities.

Figure 6:
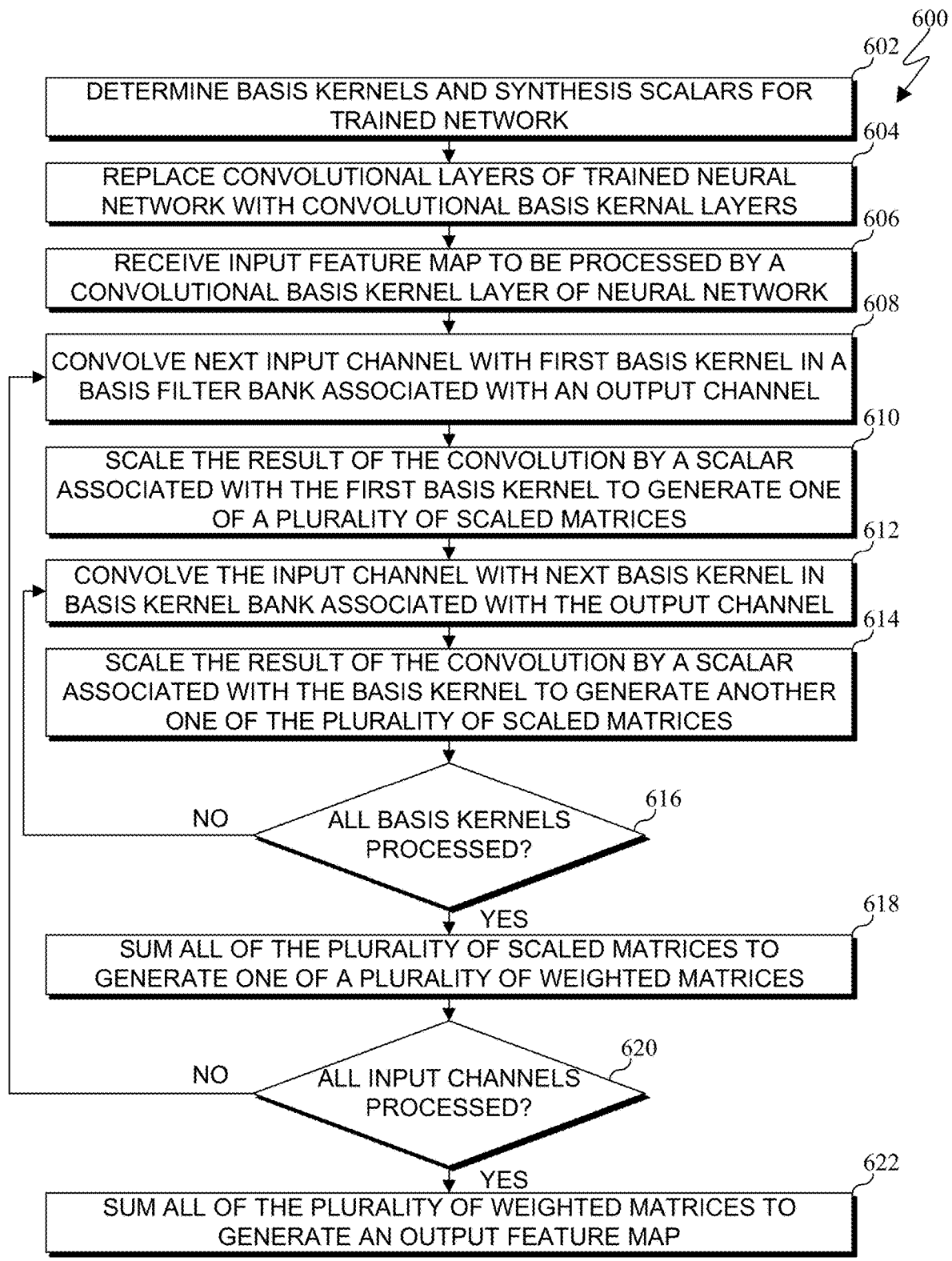
FIG. 6 illustrates a flowchart of a convolutional basis kernel layer process in accordance with embodiments of the present disclosure.

FIG. 6 illustrates a flowchart of a convolutional basis kernel layer process 600 in accordance with embodiments of the present disclosure. FIG. 6 does not limit the scope of this disclosure to any particular embodiments. While process 600 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 600 is described with respect to processor 210 of the server 200 of FIG. 2 and processor 340 of the electronic device 300 of FIG. 3. However, the process 600 can be used with any other suitable system.

At block 602, the processor determines the basis kernels and synthesis scalars to be used in the trained neural network. The basis kernels and synthesis scalars can be determined according to formula (4) disclosed herein. As the neural network in process 600 is already trained, at block 604 the basis kernels and scalars are implemented in convolutional basis filter layers by simply replacing the convolutional layers of the trained neural network. At block 606, one or more input feature maps are received by the processor. It will be understood that each input feature map can be a channel N to be convolved with the basis filters, or the input can be an image having one or more channels. For example, if the input is an RGB image, the input image can be divided into three channels to be processed by the neural network.

At block 608, the processor convolves the next input channel, which can be the first input channel X(0), by a first basis kernel g(0) in the basis filter bank 404, the basis filter bank 404 being associated with an output channel. At block 610, the processor scales the result of the convolution performed at block 608 by multiplying the convolution result by the scalar associated with the first basis kernel, generating one of a plurality of scaled inputs or matrices. At block 612, the processor convolves the same input channel with the next basis kernel in the basis filter bank 404. At block 614, the processor scales the result of the convolution performed at block 612 by multiplying the convolution result by the scalar associated with the basis kernel used for the convolution of block 612, generating another one of a plurality of scaled matrices.

At decision block 616, the processor determines if all the basis kernels have been processed, or convolved, with the input channel. If not, the process 600 moves back to block 612, and the processor convolves the input channel with the next basis kernel in the basis filter bank 404, and at block 614 scales the result of the convolution with another scalar that is associated with the basis kernel used for the convolution, generating another one of the plurality of scaled matrices. If at decision block 616 the processor determines that all basis kernels in the basis filter bank 404 were convolved with the input channel and scaled by a scalar, the process 600 moves to block 618. At block 618, the processor sums together all of the plurality of scaled matrices to generate one of a plurality of weighted matrices, $Y(j)^i$.

At decision block 620, the processor determines whether all of the input channels are processed. If not, the process 600 moves back to block 608, and the processor convolves the next input channel, such as one of X(1)-X(N-1), with each of the basis kernels in the basis filter bank 404, scales each of the results, and sums the scaled matrices, at blocks 608-618. The processor loops the process 600 at blocks 608-618 until at decision block 620 the processor determines that all input channels are processed. Once all the input channels are processed, the processor has generated a plurality of weighted matrices, each denoted by $Y(j)^i$. At block 622, the processor sums together all of the weighted matrices to generate an output feature map Y(j). This output feature map can then be passed to subsequent layers of the neural network. It will be understood that, for a full convolutional basis kernel layer, there can be more than one output feature map Y(j). If additional feature maps are to be generated, the processor repeats blocks 608-622 until all output feature maps are generated. It will also be understood that the same input channels are used to generate each output feature map, while the basis kernels in the basis filter bank 404 and the scalars or polynomial coefficients used can be different for each output feature map. It will also be understood that a bias can be introduced to the convolutions performed by the processor depending on the design of the neural network, as well as applying padding to the inputs.

Figure 7A:
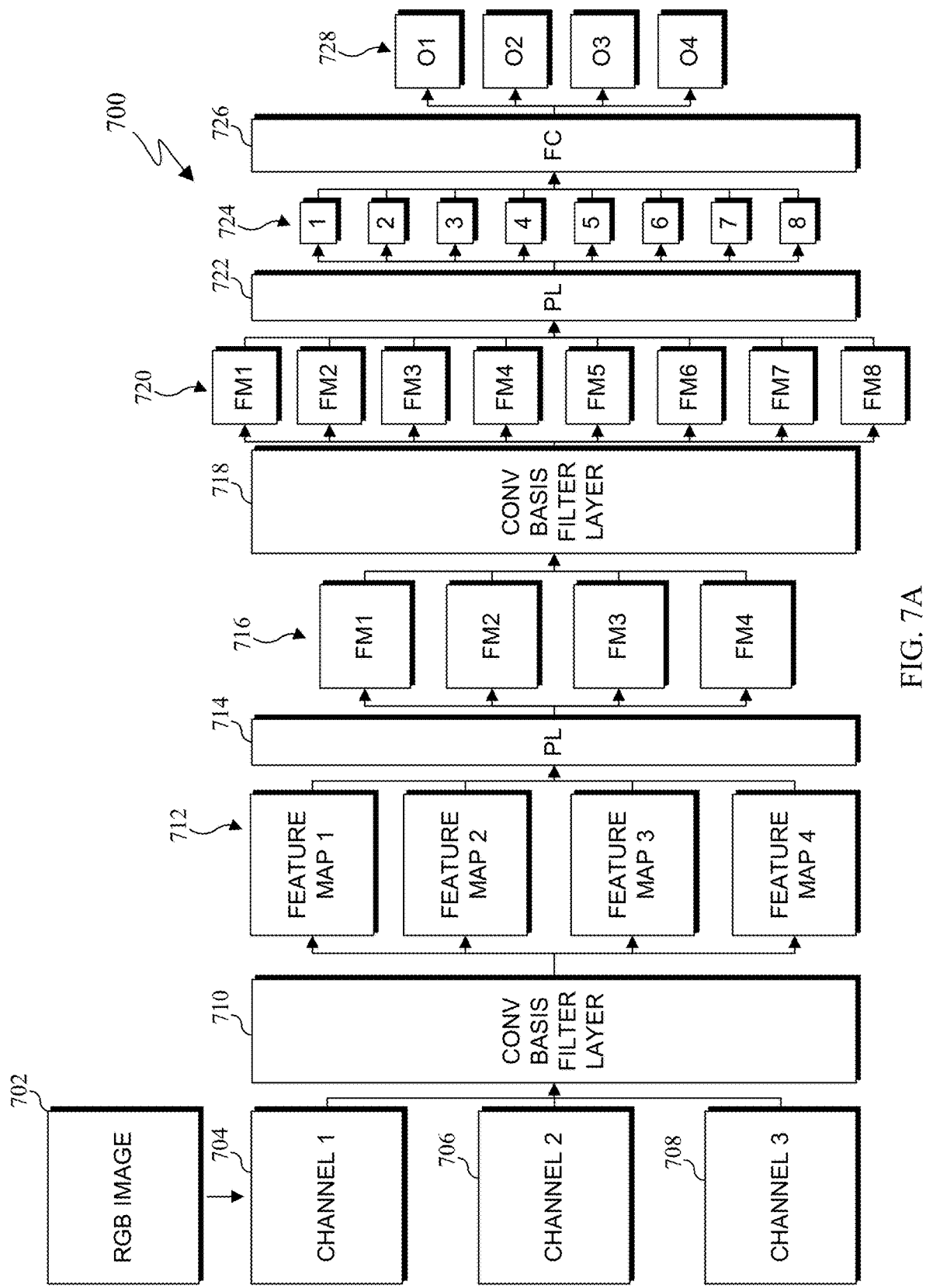
FIG. 7A illustrates a block diagram of an example convolutional neural network incorporating convolutional basis filter layers in accordance with embodiments of the present disclosure.

FIG. 7A illustrates a block diagram of an example convolutional neural network 700 using convolutional basis filter layers in accordance with embodiments of the present disclosure. The processor 210 of the server 200 or the processor 340 of electronic device 300 can execute the convolutional neural network 700. The example convolutional neural network 700 is designed to classify an object in an image. For example, the network 700 can be designed to determine whether an image includes an image of the letter A, B, C, or D. This is but one example, and the network 700 could be designed to classify other objects in images, such as objects in a scene like animals, people, etc., numbers, or other objects. The processor receives an RGB image 702 captured by a device, such as the camera 365 in the electronic device 300. As the RGB image 702 is a color image, the image can be divided into three channels or matrices, a first channel 704, a second channel 706, and a third channel 708, to be used as inputs in the first layer of the convolutional neural network 700.

The first layer in the example network 700 is a convolutional basis filter layer 710 in accordance with the present disclosure. The processor at the convolutional basis filter layer 710 convolves each of the channels 704-708 with basis kernels in a basis kernel bank, scales the result of each convolution with a polynomial coefficient or scalar value, and sums the results of the scaling for each input to generate one or more output feature maps, as described in detail herein. The number of output feature maps depends on the design and purpose of the neural network. For the example illustrated in FIG. 7A, the first convolutional basis filter layer 710 is designed to produce four output feature maps 712. In many neural networks, the output feature maps will be of a smaller size or resolution than the input channels, depending on for example the stride used for the convolutions in the convolutional layer. This is illustrated in FIG. 7A, as the feature maps 712 are illustrated as a smaller size than the channels 704-708. Although not illustrated in FIG. 7A, the processor can process each output feature map 712 at one or more rectifier linear unit (RELU) layers to rectify each output feature map 712 with an activation function.

The processor performs pooling at a pooling layer 714 on each of the output feature maps 712, to downsample the feature maps into feature maps 716 of a smaller size, in anticipation of the next convolutional basis filter layer 718. Pooling can be accomplished by max pooling, mean pooling, or other methods. The processor then processes the feature maps 716 at another convolutional basis filter layer 718 in accordance with the present disclosure. The processor at the convolutional basis filter layer 718 convolves each of the feature maps 716 with basis kernels in a basis kernel bank, scales the result of each convolution with a polynomial coefficient or scalar value, and sums the results of the scaling for each input to generate one or more output feature maps, as described in detail herein. The number of output feature maps depends on the design and purpose of the neural network. For the example illustrated in FIG. 7A, the convolutional basis filter layer 718 is designed to produce eight output feature maps 720. In many neural networks, the output feature maps will be of a smaller size or resolution than the input channels, depending on for example the stride used for the convolutions in the convolutional layer. This is illustrated in FIG. 7A, as the feature maps 720 are of a smaller size than the feature maps 716. Although not illustrated in FIG. 7A, the processor can process each output feature map 720 at one or more rectifier linear unit (RELU) layers to rectify each output feature map 720 with an activation function.

The processor performs pooling at a pooling layer 722 on each of the output feature maps 720, to downsample the feature maps into feature maps 724 of a smaller size. Pooling can be accomplished by max pooling, mean pooling, or other methods. In the example illustrated, after performing pooling on the feature maps 720, the feature maps 724 are reduced to an input size acceptable for processing at a fully connected layer 726. Neurons in the fully connected layer have connections to all activations from the previous layer. It will be understood that more than one fully connected layer can be implemented depending on the design of the neural network. The processor at the fully connected layer 726 performs activation functions on the feature maps 724, such as the Softmax function or other functions. The fully connected layer 726 outputs an N dimensional vector where N is the number of classes to choose from for object classification, with each number in the vector representing a probability that the image includes the class. For example, in the convolutional neural network 700, the output of the fully connected layer 726 is a vector 728 of outputs. In this example, the convolutional neural network 700 can be designed to recognize the letters A, B, C, or D in an image such as RGB image 702. The vector 728 can include as output 1 a probability for A, a probability for B as output 2, a probability for C as output 3, and a probability for D as output 4, which can be indicated by values between 0 and 1. For example, a vector including values [0, 0.1, 0.1, 0.8] would indicate a 0% probability for A, a 10% probability for each of B and C, and an 80% probability for D.

The example convolutional neural network 700 illustrates that the convolutional basis filter layer described in the present disclosure can be implemented in an already functioning and trained neural network, without retraining the network, to allow the neural network to continue performing its purpose, while substantially reducing the number of operations and parameters performed by the convolutional layers, increasing the speed of the neural network and freeing system resources for other tasks or for performing operations on larger kernels.

Convolutional neural networks can be designed in a variety of ways, and it will be understood that FIG. 7A is but one example for illustrative purposes. The convolutional neural network 700 could have a number of additional layers, a different number of input and output feature maps at each layer, and could include any number of RELU layers, Bnorm layers, or other layers. It will be further understood that convolutional basis filter layers can be implemented in convolutional networks used for purposes other than classification, such as semantic segmentation, image verification, pixel to pixel applications, or other purposes.

Figure 7B:
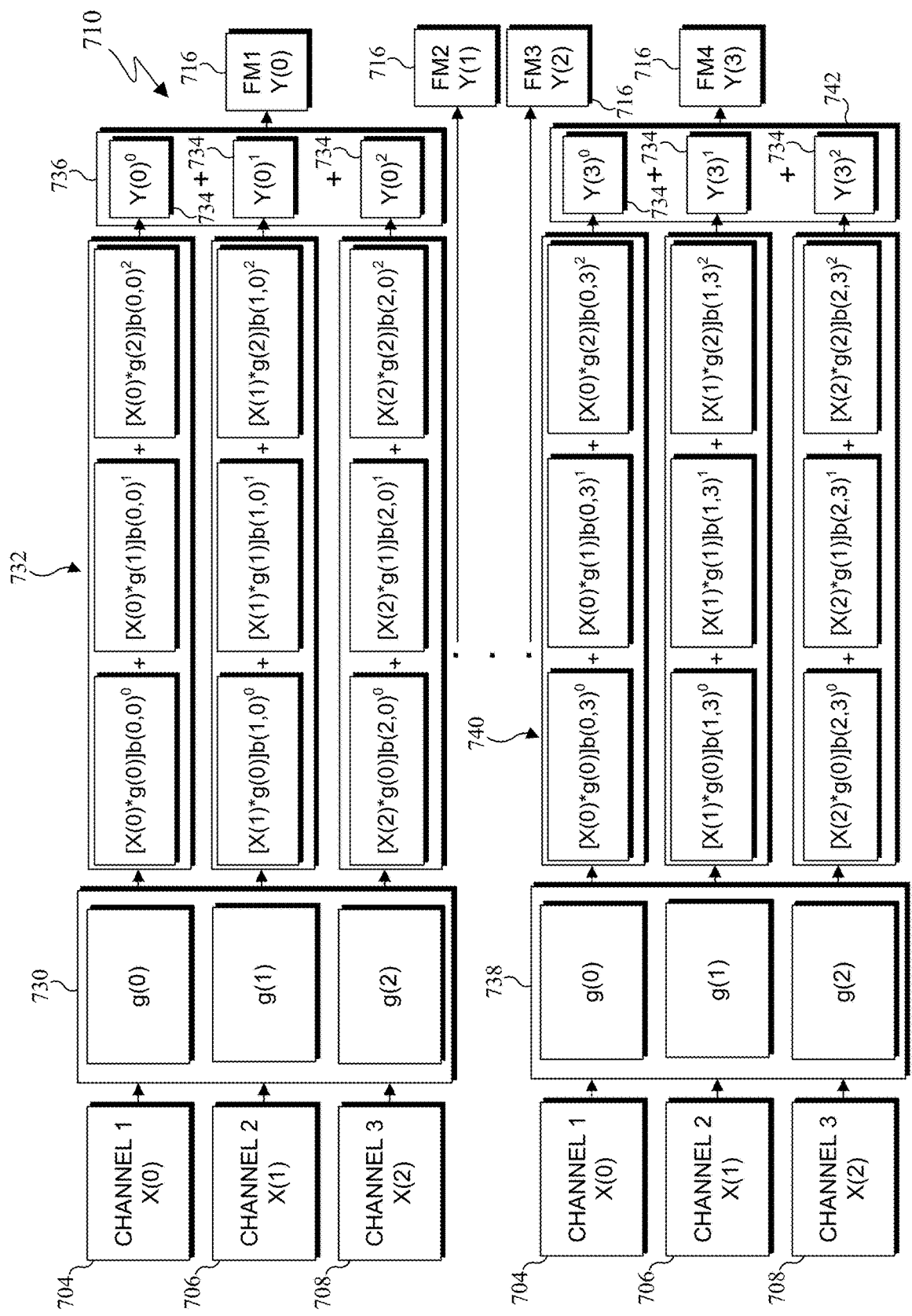
FIG. 7B illustrates an example block diagram of a convolutional basis filter layer in accordance with embodiments of the present disclosure.

FIG. 7B illustrates an example block diagram of the convolutional basis filter layer 710 in accordance with embodiments of the present disclosure. As shown in FIG. 7B, the processor convolves each channel 704-708, with each basis filter in a basis filter bank 730. In the example illustrated in FIG. 7B, the basis filter bank 730 includes three basis filters for illustrative purposes, but it will be understood that other numbers of basis filters can be used. For example, the convolution of the second input channel 706 with each of the basis filters in the basis filter bank 730 results in three convolved matrices, $X(1)*g(0)$, $X(1)*g(1)$, and $X(1)*g(2)$. The processor scales each of the convolved matrices by a scalar $b(i,j)^k$, at blocks 732, with each scalar being defined by the channel being convolved with the basis filters, by the output feature map to be generated, and by the basis filter used. For example, as illustrated in FIG. 7B, the blocks 732 and block 736 produce a first output feature map 716, Y(0). For the convolution of the second channel 706 with basis filter g(2), denoted by X(1)*g(2), as shown in blocks 732, the processor multiplies the resultant matrix of X(1)*g(2) by the scalar defined as $b(1,0)^2$, since i=1, j=0, and k=2. The scalar $b(1,0)^2$ is thus a squared value associated with the second input channel 706 and the output channel Y(0). The value is squared because the second channel 706 was convolved with g(2). The processor multiplies this squared value with the matrix resulting from convolving the second channel 706 with the basis filter g(2), and adds the result to the results of each other convolved and scaled matrix for the second channel 706, as illustrated in FIG. 7B at blocks 732, to generate an output component 734, $Y(0)^1$ shown at block 736. The processor generates an output component for each of the other channel inputs 704 and 708, and the processor sums each of the output components 734 at block 736 to create the first feature map Y(0) of the output feature maps 716.

The processor repeats the process for each output feature map 716 to be generated by the convolutional basis filter layer 710. In this example, the processor generates four output feature maps 716, Y(0)-Y(3). As shown in FIG. 7B, as a further example, to create output feature map Y(3), the processor convolves the same channel inputs 704-708 with basis filters in a basis filter bank 738 to produce a plurality of convolved matrices, which the processor scales by the associated scalars in blocks 740 to create output components 742, $Y(3)^0$, $Y(3)^1$, and $Y(3)^2$. The processor sums the output components 742 at block 744 to create the fourth output feature map Y(3) of the output feature maps 716.

It will be understood that the a similar process as described with respect to convolutional basis filter layer 710 is performed by the processor at other convolutional basis filter layers of the convolutional neural network 700, such as at convolutional basis filter layer 718 illustrated in FIG. 7A. The convolutions and scaling performed by the processor at other convolutional basis filter layers are defined by the number of input feature maps or channels and the sizes of those channels, and the number of output feature maps to be generated. For example, the processor at the convolutional basis filter layer 718 uses four input channels to produce eight output feature maps 720, and thus the scalars used will vary for each input and output.

Figure 8:
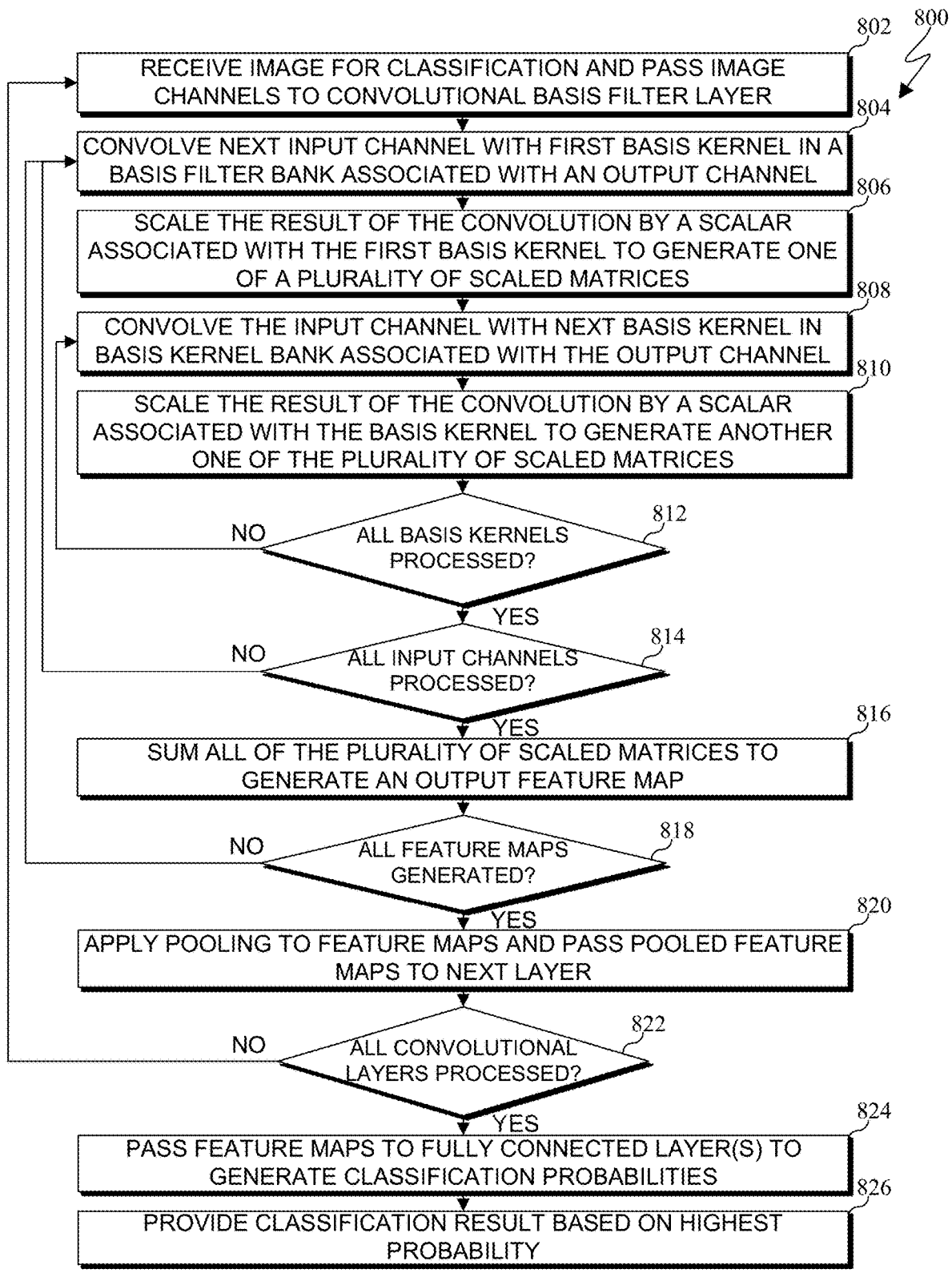
FIG. 8 illustrates a flowchart of a convolutional neural network process in accordance with embodiments of the present disclosure.

FIG. 8 illustrates a flowchart of a convolutional neural network process 800 in accordance with embodiments of the present disclosure. FIG. 8 does not limit the scope of this disclosure to any particular embodiments. While process 800 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 800 is described with respect to processor 210 of the server 200 of FIG. 2 and processor 340 of the electronic device 300 of FIG. 3. However, the process 800 can be used with any other suitable system. The process 800 can be applied to the neural network illustrated in FIGS. 7A and 7B.

At block 802, the processor receives an image for classification by the neural network and passes the image channels of the image to a convolutional basis filter layer. The image can be an RGB image such as image 702, and can include multiple channels. At block 804, the processor convolves the next input channel, which can be the first input channel X(0), by a first basis kernel g(0) in a basis filter bank, the basis filter bank being associated with an output channel. At block 806, the processor scales the result of the convolution performed at block 804 by multiplying the convolution result by the scalar associated with the first basis kernel, generating one of a plurality of scaled inputs or matrices. At block 808, the processor convolves the same input channel with the next basis kernel in the basis filter bank. At block 810, the processor scales the result of the convolution performed at block 808 by multiplying the convolution result by the scalar associated with the basis kernel used for the convolution of block 808, generating another one of a plurality of scaled matrices.

At decision block 812, the processor determines if all the basis kernels have been processed, or convolved, with the input channel. If not, the process 800 moves back to block 808, and the processor convolves the input channel with the next basis kernel in the basis filter bank, and at block 810 scales the result of the convolution with another scalar that is associated with the basis kernel used for the convolution, generating another one of the plurality of scaled matrices. If at decision block 812 the processor determines that all basis kernels in the basis filter bank were convolved with the input channel and scaled by a scalar, the process 800 moves to decision block 814. At decision block 814, the processor determines whether all of the input channels are processed. If not, the process 800 moves back to block 804, and the processor convolves the next input channel, such as one of X(1)-X(N−1), with each of the basis kernels in the basis filter bank and scales each of the results, at blocks 804-814. The processor loops the process 800 at blocks 804-814 until at decision block 814 the processor determines that all input channels are processed. Once all the input channels are processed, at block 816, the processor sums together all of the scaled matrices to generate an output feature map Y(j). This output feature map can then be passed to subsequent layers of the neural network.

It will be understood that, for a full convolutional basis kernel layer, there can be more than one output feature map Y(j). For example, as illustrated in FIG. 7A, convolutional basis filter layer 710 produces four feature maps 712. At decision block 818, the processor determines if all feature maps for the convolutional layer are generated. If additional feature maps are to be generated, the processor repeats blocks 804-818 until all output feature maps are generated. It will be understood that the same input channels are used to generate each output feature map. It will also be understood that a bias can be introduced to the convolutions performed by the processor depending on the design of the neural network, as well as applying padding to the inputs. If at decision block 818 the processor determines that all feature maps are generated, the process 800 moves to block 820.

At block 820, the processor performs pooling on the feature maps generated in previous blocks at a pooling layer, and passes the pooled feature maps to the next layer in the neural network. Pooling downsamples the feature maps to decrease the size of the feature maps, in anticipation of the next convolutional basis filter layer. Pooling can be accomplished by max pooling, mean pooling, or other methods. Although not illustrated in FIG. 8, the processor can also process each output feature map at one or more ReLU layers to rectify each output feature map with an activation function or include other layers in the process 800. At decision block 822, the processor determines if all convolutional layers in the neural network have been processed. If not, the process 800 moves back to block 802 to pass the input images or feature maps to the next convolutional basis filter layer. The process 800 loops blocks 802-822 until all convolutional basis filter layers, and all layers in between the convolutional basis filter layers, are reached and processed.

If at decision block 822 the processor determines that all convolutional basis filter layers have been processed, the process 800 moves to block 824. At block 824, the feature maps created by the most recent layer are passed to one or more fully connected layers to generate classification probabilities. The fully connected layer(s) outputs an N dimensional vector where N is the number of classes to choose from for object classification, with each number in the vector representing a probability that the image includes the class. For example, the output of the fully connected layer(s) is a vector of outputs. In this example, the convolutional neural network can be designed to recognize the letters A, B, C, or D in the image. The vector can include as output 1 a probability for A, a probability for B as output 2, a probability for C as output 3, and a probability for D as output 4, which can be indicated by values between 0 and 1. For example, a vector including values [0, 0.1, 0.1, 0.8] would indicate a 0% probability for A, a 10% probability for each of B and C, and an 80% probability for D. At block 826, the processor provides a classification result based on the highest probability in the vector. For instance, at block 826, if the vector values are [0, 0.1, 0.1, 0.8] in the above example, the processor returns an indication that the letter in the image is a D, or at least that the image likely includes a D.

Convolutional neural networks can be designed in a variety of ways, and it will be understood that FIG. 8 is but one example for illustrative purposes. The convolutional neural network described in process 800 could have a number of additional layers, any number of input and output feature maps at each layer, and could include any number of ReLU layers, Bnorm layers, or other layers. It will be further understood that convolutional basis filter layers can be implemented in convolutional networks used for purposes other than classification, such as semantic segmentation, image verification, pixel to pixel applications, or other purposes, and that process 800 is merely an example of a convolutional neural network employing convolutional basis filter layers as described herein.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device, comprising:
a memory; and
at least one processor coupled to the memory, the at least one processor configured to:
optimize a trained neural network, wherein, to optimize the trained neural network, the at least one processor is configured to:
determine a basis kernel and a scalar from a trained kernel of the trained neural network; and
replace a convolutional layer of the trained neural network with a basis kernel bank including the basis kernel;
convolve an input to the trained neural network with the basis kernel to generate a convolution result;
scale the convolution result by the scalar to create a scaled convolution result; and
combine the scaled convolution result with one or more of a plurality of scaled convolution results to generate an output feature map.

2. The electronic device of claim 1, wherein the memory is configured to store the basis kernel bank, the basis kernel bank including a plurality of basis kernels.

3. The electronic device of claim 2, wherein the at least one processor is further configured to:
convolve the input with each one of the plurality of basis kernels in the basis kernel bank to generate a plurality of convolution results; and
scale each one of the plurality of convolution results by one of a plurality of scalars to create the plurality of scaled convolution results.

4. The electronic device of claim 3, wherein the input includes a plurality of channels of an input image.

5. The electronic device of claim 4, wherein the at least one processor is further configured to:
convolve each of the plurality of channels of the input image with each one of the plurality of basis kernels in the basis kernel bank to generate the plurality of convolution results.

6. The electronic device of claim 5, wherein a value of each one of the plurality of scalars is defined by one of the plurality of channels, the output feature map, and one of the plurality of basis kernels in the basis kernel bank.

7. The electronic device of claim 1, wherein:
to determine the basis kernel and the scalar from the trained kernel of the trained neural network, the at least one processor is configured to synthesize the trained kernel using polynomial approximation;
the scalar is a polynomial coefficient associated with the basis kernel; and
the at least one processor is configured to use the basis kernel bank for every input to the trained neural network.

8. A method for a neural network, comprising:
optimizing a trained neural network, which comprises:
determining a basis kernel and a scalar from a trained kernel of the trained neural network; and
replacing a convolutional layer of the trained neural network with a basis kernel bank including the basis kernel;
convolving an input to the trained neural network with the basis kernel to generate a convolution result;
scaling the convolution result by the scalar to create a scaled convolution result; and
combining the scaled convolution result with one or more of a plurality of scaled convolution results to generate an output feature map.

9. The method of claim 8, wherein the basis kernel bank includes a plurality of basis kernels.

10. The method of claim 9, further comprising:
convolving the input with each one of the plurality of basis kernels in the basis kernel bank to generate a plurality of convolution results; and
scaling each one of the plurality of convolution results by one of a plurality of scalars to create the plurality of scaled convolution results.

11. The method of claim 10, wherein the input includes a plurality of channels of an input image.

12. The method of claim 11, further comprising:
convolving each of the plurality of channels of the input image with each one of the plurality of basis kernels in the basis kernel bank to generate the plurality of convolution results.

13. The method of claim 12, wherein a value of each one of the plurality of scalars is defined by one of the plurality of channels, the output feature map, and one of the plurality of basis kernels in the basis kernel bank.

14. The method of claim 8, wherein:
   determining the basis kernel and the scalar from the trained kernel of the trained neural network includes synthesizing the trained kernel using polynomial approximation;
   the scalar is a polynomial coefficient associated with the basis kernel; and
   the basis kernel bank is used for every input to the trained neural network.

15. A non-transitory computer readable medium embodying a computer program for operating an electronic device including a memory and at least one processor, the computer program comprising computer readable program code that, when executed by the at least one processor, causes the electronic device to:
   optimize a trained neural network, wherein the computer readable program code that when executed causes the electronic device to optimize the trained neural network comprises computer readable program code that when executed causes the electronic device to:
      determine a basis kernel and a scalar from a trained kernel of the trained neural network; and
      replace a convolutional layer of the trained neural network with a basis kernel bank including the basis kernel;
   convolve an input to the trained neural network with the basis kernel to generate a convolution result;
   scale the convolution result by the scalar to create a scaled convolution result; and
   combine the scaled convolution result with one or more of a plurality of scaled convolution results to generate an output feature map.

16. The non-transitory computer readable medium of claim 15, wherein the basis kernel bank includes a plurality of basis kernels.

17. The non-transitory computer readable medium of claim 16, wherein the computer program further comprises computer readable program code that, when executed by the at least one processor, cause the electronic device to:
   convolve the input with each one of the plurality of basis kernels in the basis kernel bank to generate a plurality of convolution results; and
   scale each one of the plurality of convolution results by one of a plurality of scalars to create the plurality of scaled convolution results.

18. The non-transitory computer readable medium of claim 17, wherein the input includes a plurality of channels of an input image.

19. The non-transitory computer readable medium of claim 18, wherein the computer program further comprises computer readable program code that, when executed by the at least one processor, cause the electronic device to:
   convolve each of the plurality of channels of the input image with each one of the plurality of basis kernels in the basis kernel bank to generate the plurality of convolution results.

20. The non-transitory computer readable medium of claim 19, wherein a value of each one of the plurality of scalars is defined by one of the plurality of channels, the output feature map, and one of the plurality of basis kernels in the basis kernel bank.

* * * * *